United States Patent [19]

Landry

[11] Patent Number: 5,458,539
[45] Date of Patent: Oct. 17, 1995

[54] FLYWEIGHT WITH A LATERAL KNOB

[75] Inventor: Jean-Bernard Landry, Drummondville, Canada

[73] Assignee: Powerbloc IBC Canada Inc., Drummondville, Canada

[21] Appl. No.: 289,419

[22] Filed: Aug. 12, 1994

[51] Int. Cl.$^6$ ................................................ F16H 61/00
[52] U.S. Cl. ........................................... 474/13; 474/46
[58] Field of Search ................................ 474/11–14, 46

[56] References Cited

U.S. PATENT DOCUMENTS

| | | | |
|---|---|---|---|
| 3,659,470 | 5/1972 | Beaudoin | 74/230.17 |
| 4,102,214 | 7/1978 | Hoff | 474/13 |
| 4,487,595 | 12/1984 | Quick et al. | 474/46 X |
| 4,496,335 | 1/1985 | Quick et al. | 474/46 X |
| 4,634,405 | 1/1987 | Quick et al. | 474/11 X |
| 5,052,981 | 10/1991 | Robert | 474/14 |
| 5,328,413 | 7/1994 | Robert | 474/13 |

FOREIGN PATENT DOCUMENTS 1212559  10/1986  Canada .

Primary Examiner—Roger J. Schoeppel
Attorney, Agent, or Firm—Merchant, Gould, Smith, Edell, Welter & Schmidt

[57] ABSTRACT

The driving pulley is used in a variable-speed belt drive, which includes, in particular, two radially converging ramps facing each other and coaxial to a shaft, one ramp being rigidly attached to a movable flange and the other ramp being rigidly attached to the shaft in spaced relationship with the movable flange. A plurality of sliding flyweights are symmetrically located around the shaft and radially movable between the ramps. The improvement in the driving pulley is that each ramp includes a contact surface on which the flyweights are in contact wherein at least one movable ramp contact surface is curved. Each flyweight also includes a lateral knob engaged with the curved contact surface for ensuring that the contact point of the sliding flyweights with a curved contact surface does not substantially change as the flyweights slide.

4 Claims, 3 Drawing Sheets

FLYWEIGHT WITH A LATERAL KNOB

FIELD OF THE INVENTION

The present invention relates to an improvement in a driving pulley of a variable-speed belt drive adapted to receive a trapezoidal belt by which power is transmitted from the driving pulley to a driven pulley.

BACKGROUND OF THE INVENTION

Variable-speed belt drives are commonly used on small vehicles such as snowmobiles, scooters or small cars. Such belt drives substantially comprise a driving pulley, a trapezoidal belt and a driven pulley. The driving pulley is linked to an engine and the driven pulley is usually mechanically connected to ground traction means, such as wheels or tracks.

The main object of using a variable-speed belt drive is to automatically change the winding diameter of the driving and the driven pulleys in order to have a maximum torque at low speeds and a reasonable engine rotation speed at high speeds. The sides of the trapezoidal belt are, on each pulley, gripped between two opposite flanges wherein one is fixed and one is movable. At low speeds, the winding diameter of the driving pulley is small and the winding diameter of the driven pulley is maximum. As the rotation speed of the driving pulley increases, sliding flyweights, located between radially converging ramps facing each other, are subjected to an increasing outward force pushing the ramps away from each other. This axial thrust generated by the flyweights is counterbalanced by biasing means, such as a helicoidal spring mounted around the shaft of the driving pulley, which biases the movable flange away from the fixed flange. As the axial thrust pushes the movable flange towards the fixed flange, the spring is further compressed. The movement of the movable flange stops when the axial thrust becomes substantially equal to the opposite biasing force.

When the rotation speed of the engine decreases, the winding diameter of the driving pulley decreases since the movable flange of the driving pulley moves back away from the fixed flange because the biasing force is then more important than the axial thrust of the flyweights. The movement of the movable flange stops when the axial thrust becomes substantially equal to the opposite biasing force.

An example of a driving pulley in a variable-speed belt drive is disclosed in U.S. Pat. Nos. 3,659,470 and 5,052,981, and also in Canadian Patent No. 1,212,559.

One of the drawbacks of conventional driving pulleys is that the flyweights may have problems when following a curved contact surface of a ramp because the contact point moves as the flyweights are displaced. This affects the normal function of the driving pulley and alters the calibration thereof.

SUMMARY OF THE INVENTION

The object of the present invention is to ensure that the contact point of the sliding flyweights with a curved contact surface does not substantially change.

More particularly, the object of the present invention is to provide an improvement in a driving pulley of a variable-speed belt drive, tile driving pulley comprising:

a shaft;

two circular flanges coaxially mounted on the shaft and having respective conical walls facing each other for defining a belt receiving groove, one of the flanges being a fixed flange rigidly attached to the shaft, the other flange being a movable flange slidably engaged on the shaft;

two radially converging ramps facing each other and coaxial to the shaft, one ramp being rigidly attached to the movable flange opposite its conical wall and the other ramp being rigidly attached to the shaft in spaced relationship with the movable flange;

a plurality of sliding flyweights symmetrically disposed around the shaft and radially movable between the ramps;

guiding means for keeping the flyweights in a straight radial course between the ramps; and biasing means for biasing the movable flange away from the fixed flange.

The improvement of this driving pulley is that:

each ramp comprises a contact surface on which the flyweights are in contact, at least one contact surface being curved; and each flyweight comprises a lateral knob engaged with the curved contact surface.

A non restrictive description of a preferred embodiment will now be given with reference to the appended drawings.

DESCRIPTION OF A PREFERRED EMBODIMENT

Figure 1:
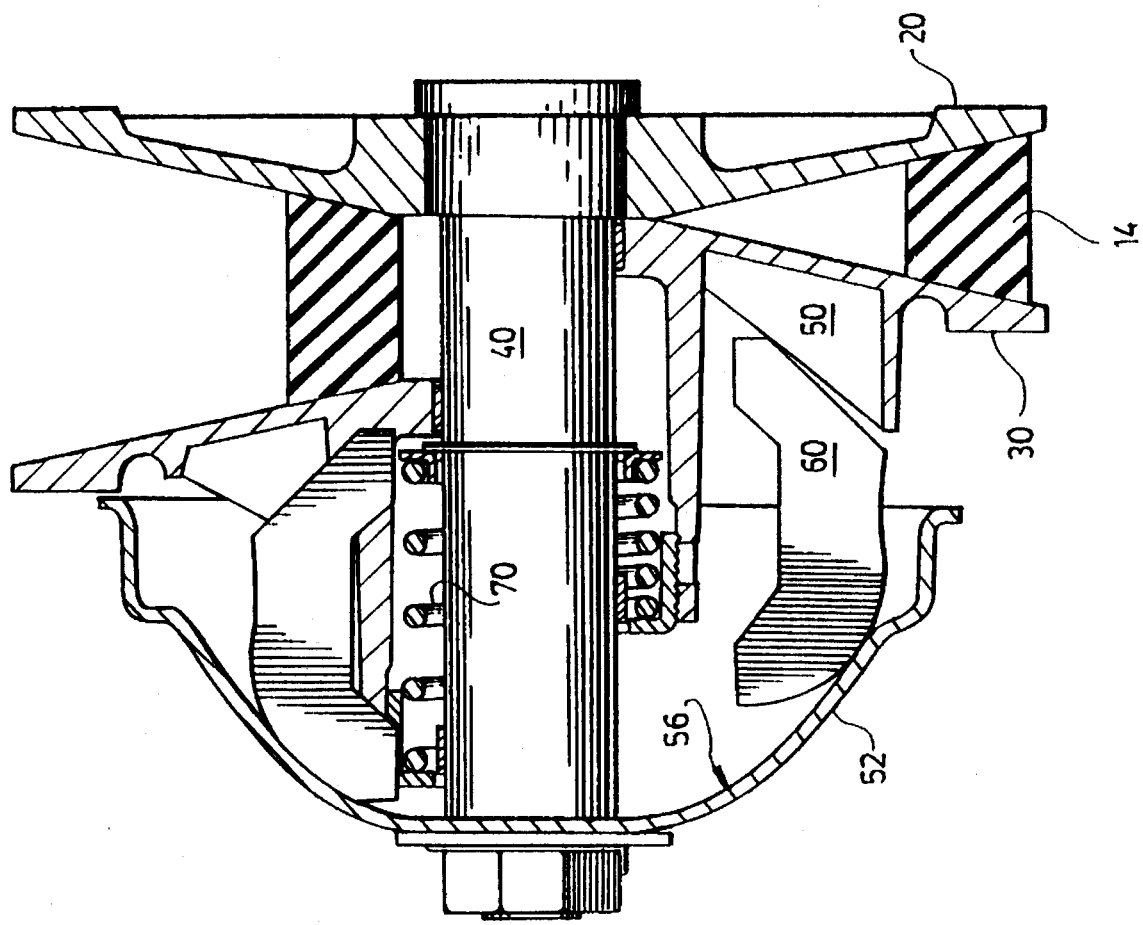
FIG. 1 is a cross-sectional view of a driving pulley according to the prior art.
Figure 2:
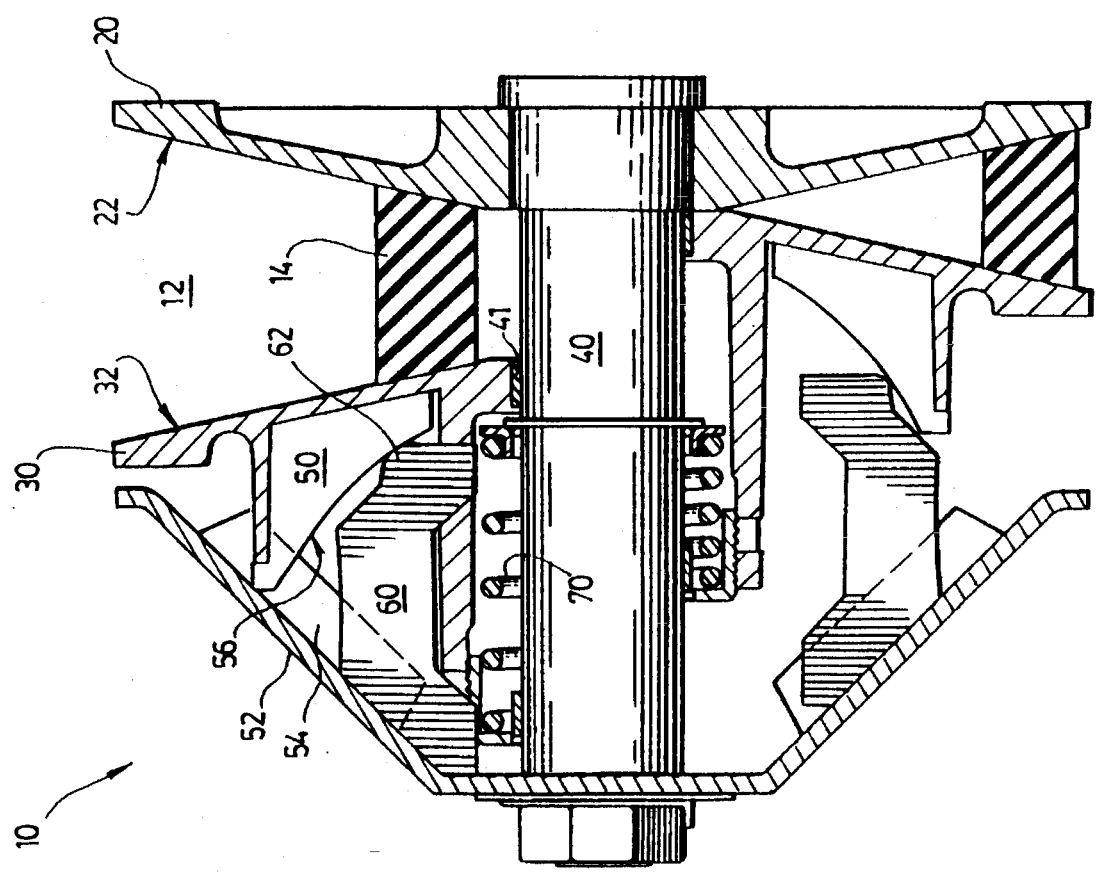
FIG. 2 is a cross-sectional view of a driving pulley according to the present invention.

As shown in FIGS. 1 and 2, the driving pulley, generally designated 10, comprises two circular flanges 20 and 30 coaxially mounted on a shaft 40. Each of the flanges 20 and 30 has a conical wall, respectively designated 22 and 32, provided in a face-to-face relationship with the other for defining a groove 12 for a trapezoidal belt 14. The flange 20 is a fixed flange rigidly attached to the shaft 40. The flange 30 is a movable flange slidably engaged on the shaft 40 able to slide longitudinally thereon with the use of an axial bearing or a bush 41.

The driving pulley 10 is further provided with two radially converging ramps 50 and 52, facing each other and coaxial to the shaft 40. The ramp 50 is rigidly attached to the movable flange 30 on a side opposite the conical wall 32. As for the ramp 52, it is rigidly attached to the shaft 40 in spaced relationship with the movable flange 30. Both ramps 50 and 52 are said to be radially converging, which means that the distance between their surface oriented towards the other is gradually decreasing with the radius. These surfaces, also referred to as the contact surfaces, should not have very abrupt changes in their slope and bear the flyweights 60.

At least two sliding flyweights 60 are symmetrically disposed around the shaft 40 and are radially movable between the ramps 50 and 52. The flyweights 60 are kept in a straight radial course between the ramps by guiding means, which may consist, for example, of flanges 54 projecting from the ramp 52. Other guiding constructions are possible and may be easily apparent to a person skilled in the art.

The term "sliding" in front of "flyweights" means that the flyweights are blocks having opposite sides sliding against the contact surfaces of the ramps.

The driving pulley 10 comprises biasing means for biasing the movable flange 30 away from the fixed flange 20. It allows counterbalancing of the axial thrust which is the resultant force generated by the flyweights 60 upon rotation of the driving pulley 10. The biasing means is preferably a helicoidal spring 70 having a first end connected to the shaft 40 and a second end connected to the movable flange 30.

At low speeds, the winding diameter of the driving pulley 10 is small and the winding diameter of the driven pulley is maximum. As the rotation speed of the driving pulley 10 increases, the flyweights 60 located between the radially converging ramps 50 and 52 are subjected to an increasing outward force forcing the ramps 60 and 62 away from each other. The axial thrust so created is counterbalanced by the spring 70 and the movement of the movable flange 30 is stopped when the axial thrust and the biasing force are substantially equal.

When the rotation speed of the driving pulley 10 decreases, its winding diameter decreases since the movable flange 30 moves away from the fixed flange 20 as the biasing force becomes more important than the axial thrust of the flyweights 60. The movement of the movable flange 30 stops when the axial thrust becomes substantially equal to the opposite biasing force.

Referring to FIG. 1, showing an example of a driving pulley according to the prior art, one of the cam ramps has a curved contact surface 56 and the corresponding side of the flyweights is rounded for providing contact. The contact point between the flyweight 60 and the curved contact surface 56 is changing as the rotation speed changes. The upper half of the drawing shows the driving pulley at idle, and the lower half of the drawing shows the driving pulley at the highest rotation speed. It is clear that the contact point has moved on the flyweight 60. This may be even further amplified in some designs in which some abrupt changes in the contact surface may be present.

As shown in FIG. 2, each of the flyweights 60 comprises a lateral knob 62 engaged with the curved contact surface 56. First, the lateral knob 62 allows a close following of the contact surface 56 without substantially changing the location of the contact point on the flyweights 60, and thus changing the internal forces equilibrium acting thereon. Secondly providing a curved contact surface allows a very optimized calibration by easily modifying tile radii of curvature of the surface 56, for adapting to various working conditions or to various engines.

Of course, although the ramp 50 is shown and described as the ramp having the curved contact surface 56, it should be understood that the ramp 52 may also be the one having the curved contact surface or it may have a corresponding curved contact surface substantially identical to the one on the ramp 50.

Preferably, the ramp with the curved contact surface 56 is made of discrete parts, each aligned with a corresponding flyweight 60. This has tile advantage of reducing the costs of machining and the parts may be designed for being easily removable whenever necessary. Replacing the ramp parts is particularly useful when wear has altered the contact surface thereof or if the driving pulley 10 will be used in a new environment or under new conditions. Such removable ramp parts are particularly suitable when they are made of plastic.

Figure 3:
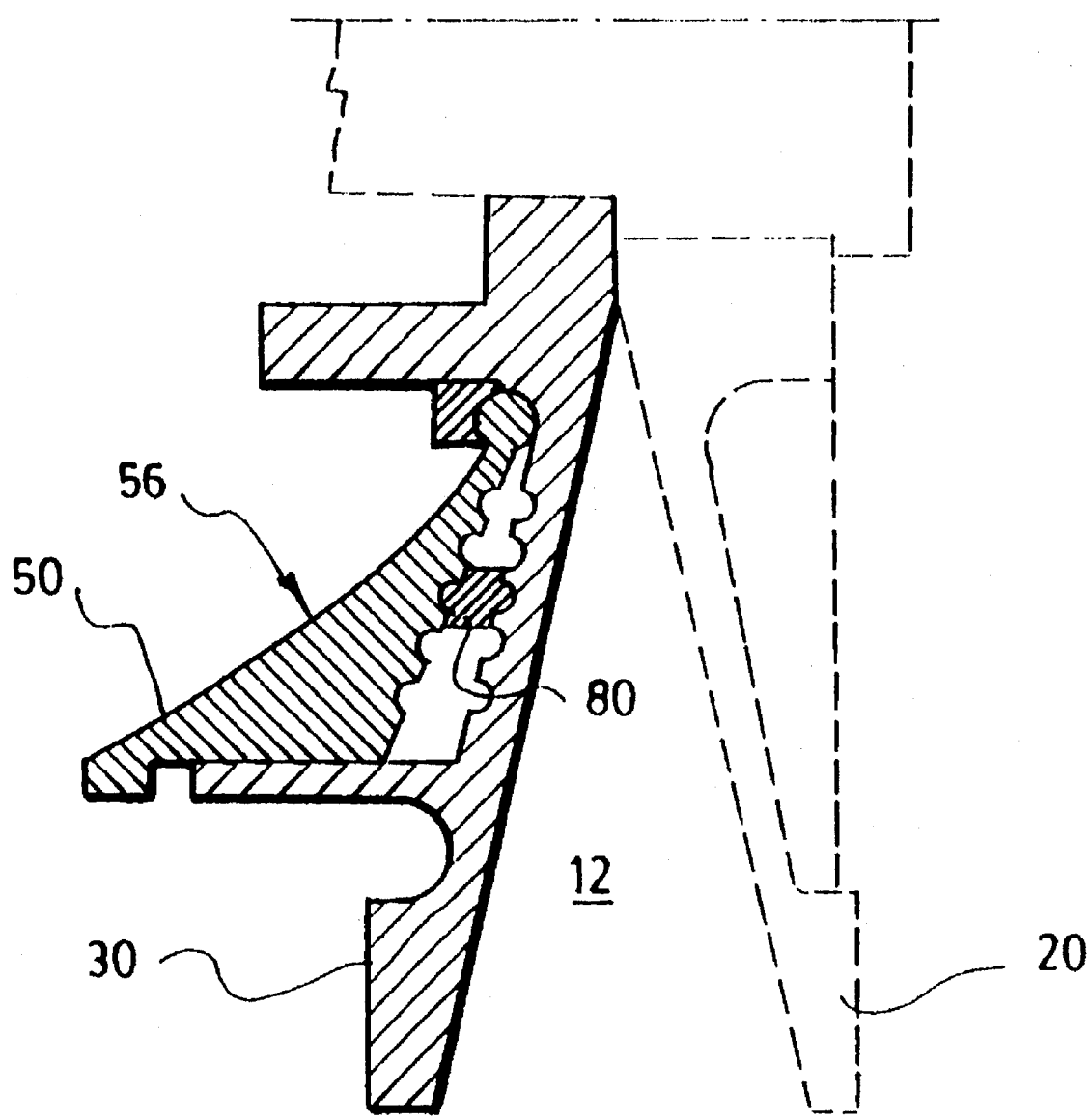
FIG. 3 is an enlarged cross-sectional view of discrete ramp part with an adjustable slider.

As shown in FIG. 3, the parts of the ramp 50 may further comprise a slide 80 located, for example, between the ramp 50 and tile movable flange 30 for selectably changing the orientation of the curved contact surface 56. This is particularly useful for fine calibration of the driving pulley 10 once the proper ramp parts have been installed.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What is claimed is:

1. In a driving pulley of a variable-speed belt drive, the driving pulley comprising:

a shaft;

two circular flanges coaxially mounted on the shaft and having respective conical walls facing each other for defining a belt receiving groove, one of the flanges being a fixed flange rigidly attached to the shaft, the other flange being a movable flange slidably engaged on the shaft;

two radially converging ramps facing each other and coaxial to the shaft, one ramp being rigidly attached to the movable flange opposite its conical wall and the other ramp being rigidly attached to the shaft in spaced relationship with the movable flange;

a plurality of sliding flyweights symmetrically disposed around the shaft and radially movable between the ramps;

guiding means for keeping the flyweights in a straight radial course between the ramps; and biasing means for biasing the movable flange away from the fixed flange;

the improvement wherein:

said one ramp comprises a curved movable surface aligned with a corresponding flyweight and with which the corresponding flyweight is in contact; and each flyweight comprises a lateral knob engaged with the corresponding curved contact surface.

2. An improved driving pulley according to claim 1, wherein the ramp comprising a curved contact surface is divided in discrete parts, each aligned with a corresponding flyweight.

3. An improved driving pulley according to claim 2, wherein each discrete ramp part is made of plastic.

4. An improved driving pulley according to claim 2, wherein each discrete ramp part comprises a slide located between the discrete ramp part and the movable flange for selectably changing the orientation of the curved contact surface.

* * * * *